United States Patent [19]

Tanigawa et al.

[11] 4,034,369
[45] July 5, 1977

[54] CHECK CIRCUIT FOR CHECKING VEHICLE WARNING SYSTEM

[75] Inventors: Kou Tanigawa; Kenzo Hashikawa, both of Kobe; Jun Ota, Toyota, all of Japan

[73] Assignees: Fujitsu Ten Ltd., Kobe; Toyota Jidosha Kogyo Kabushiki Kaisha, both of Japan

[22] Filed: Nov. 24, 1976

[21] Appl. No.: 744,612

[30] Foreign Application Priority Data
Nov. 28, 1975 Japan .................. 50-143105

[52] U.S. Cl. .................. 340/52 F; 340/414
[51] Int. Cl.² .................. G08B 19/00
[58] Field of Search ........... 340/52 R, 52 D, 52 F, 340/213 R, 214, 410, 414

[56] References Cited
UNITED STATES PATENTS

| 3,879,704 | 4/1975 | Noji | 340/52 F |
| 3,949,356 | 4/1976 | Fuzzell et al. | 340/52 F |

*Primary Examiner*—Alvin H. Waring
*Attorney, Agent, or Firm*—Daniel Jay Tick

[57] ABSTRACT

Abnormal conditions of the operating members of an automotive vehicle are detected by a plurality of sensors provided at the operating members. Detection signals of the sensors are fed as input to a plurality of warning issuing devices of the vehicle warning system. A priority sequence judging circuit is connected between the sensors and the warning issuing devices. The priority sequence judging circuit operates when more than one of the sensors detect abnormal conditions simultaneously, determines the degree of importance of the detected signals from the sensors and preferentially provides the most important signals as outputs to the warning issuing devices in accordance with the order of their importance. A check circuit is connected to the warning issuing devices. The check circuit artificially creates the same condition as that obtained when the sensors detect abnormalities to actuate all the warning issuing devices and releases such condition in accordance with a predetermined sequence at predetermined time delays. The warning issuing devices are thereby checked for normal operation in accordance with the sequence.

6 Claims, 13 Drawing Figures

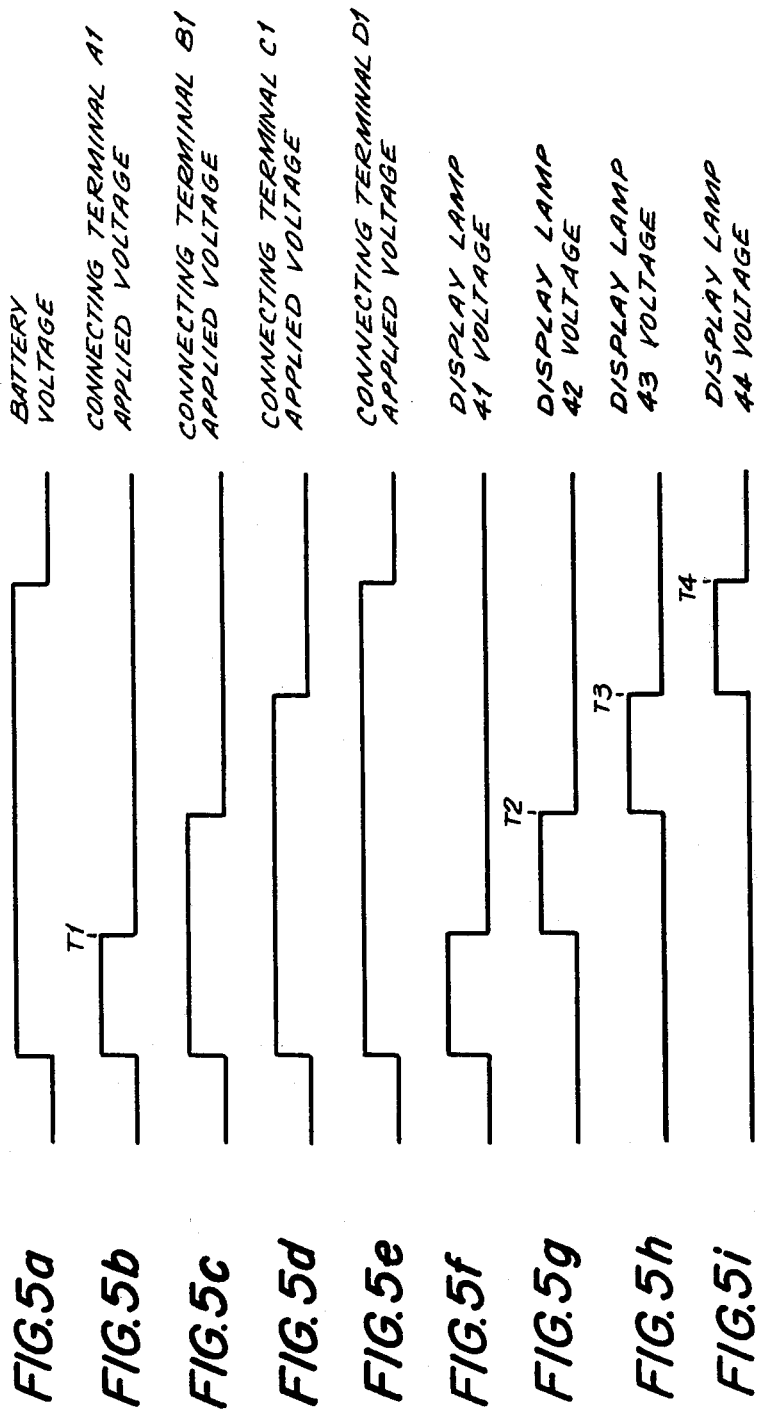

CHECK CIRCUIT FOR CHECKING VEHICLE WARNING SYSTEM

BACKGROUND OF THE INVENTION

The present invention relates to a check circuit for a vehicle warning system. More particularly, the invention relates to a check circuit for checking the integrity of the warning issuing devices of a vehicle warning system which detects a fault or an abnormality of the operating members of an automotive vehicle whereby the circuit warns the driver of an abnormality and thereby contributes to safe driving.

A warning system has recently been installed in various types of vehicles, and especially automotive vehicles. In the warning system, an alarm signal is produced and displayed by alarm lamps, or the like, when an abnormality arises or occurs in operating members such as, for example, the lighting system, the engine, the brake system, which results in danger to the vehicle and/or its occupants.

A well known warning system of this type utilizes sensors at the operating elements of the vehicle. A warning is provided by a display in a display device of the operating element produced by an abnormal detection signal from the sensor.

One type of known warning system utilizes a check circuit having a rotary switch. The rotary switch of the check circuit results in troublesome operation and is therefore disadvantageous. Another type of known system utilizes a check circuit having multivibrators. The use of the multivibrators results in the disadvantage that signal processing is performed digitally. This causes malfunction due to the generation of pulse noise, which is particular to automotive vehicles. Furthermore, the great number of circuits raises the cost.

The principal object of the invention is to provide a simple check circuit for checking a vehicle warning system.

An object of the invention is to provide a simple check circuit for automatically checking the integrity of a vehicle warning system.

Another object of the invention is to provide a check circuit for checking a vehicle warning system, which circuit overcomes the disadvantages of the check circuits of known warning systems.

Still another object of the invention is to provide a check circuit for checking a vehicle warning system, which circuit operates trouble-free, with facility and without malfunction.

Yet another object of the invention is to provide a check circuit of simple structure, which is inexpensive in manufacture and functions efficiently, effectively and reliably to check a vehicle warning system.

An object of the invention is to provide a check circuit which checks a vehicle warning system in accordance with a priority sequence or order by utilizing the priority sequence judging circuit of the warning system.

BRIEF SUMMARY OF THE INVENTION

In accordance with the invention, a check circuit for checking a vehicle warning system, which has a plurality of sensors each positioned at a corresponding one of a plurality of operating elements of a vehicle, the integrity of which elements is to be supervised, a plurality of warning devices each provided for a corresponding one of the sensors and controlled in operation by an abnormality detection signal from the corresponding one of the sensors, and a priority sequence judging circuit connected between the sensors and the warning devices for determining the degree of importance of detection signals from the sensors and preferentially providing an output to the warning devices in accordance with the priority of greatest importance, comprises a simulating circuit for artificially creating the same condition as that obtained when the sensors detect abnormalities to actuate all the warning devices. Delay circuits are connected to the simulating circuit and coupled to the warning devices for releasing the condition in accordance with a predetermined sequence at predetermined time delays whereby the integrity of the warning devices is checkable, item by item, in accordance with the sequence.

The vehicle warning system includes a source of electrical energy. The simulating circuit comprises a check switch having one terminal connected to the source of electrical energy and another terminal coupled to each of the warning devices. A plurality of semiconductor switching devices are provided, each connected between a corresponding one of the warning devices and a point at reference potential. The semiconductor switching devices are in normally non-conductive condition. A charging circuit is connected to the other terminal of the check switch and coupled to the semiconductor switching devices. The delay circuits comprise bias circuits coupled between the charging circuit and each of the semiconductor switching devices. The bias circuits produce bias voltages controlling the semiconductor switching devices in operation sequentially to switch the switching devices to their conductive condition in accordance with the output voltage level of the charging circuit.

Each of the semiconductor switching devices comprises a transistor.

The charging circuit comprises a condenser coupled to the semiconductor switching devices and a constant current circuit connected between the other terminal of the check switch and the condenser.

The bias circuits comprise a plurality of voltage divider circuits, each comprising a pair of resistors connected to the charging circuit and connected to each other at a common point. Each of the voltage divider circuits provides a voltage ratio different from those of the other voltage divider circuits. The common point of each of the voltage divider circuits is connected to a corresponding one of the semiconductor switching devices.

The constant current circuit of the charging circuit includes a first resistor of predetermined resistance value. The simulating circuit further comprises a second resistor having a higher resistance value than the first resistor and connected between the source of electrical energy and the condenser. The second resistor constantly precharges the condenser in normal conditions.

BRIEF DESCRIPTION OF THE DRAWINGS

In order that the invention may be readily carried into effect, it will now be described with reference to the accompanying drawings, wherein:

FIGS. 5a to 5i are graphical presentations for explaining the operation of the circuit of FIG. 4.

DETAILED DESCRIPTION OF THE INVENTION

Figure 1:
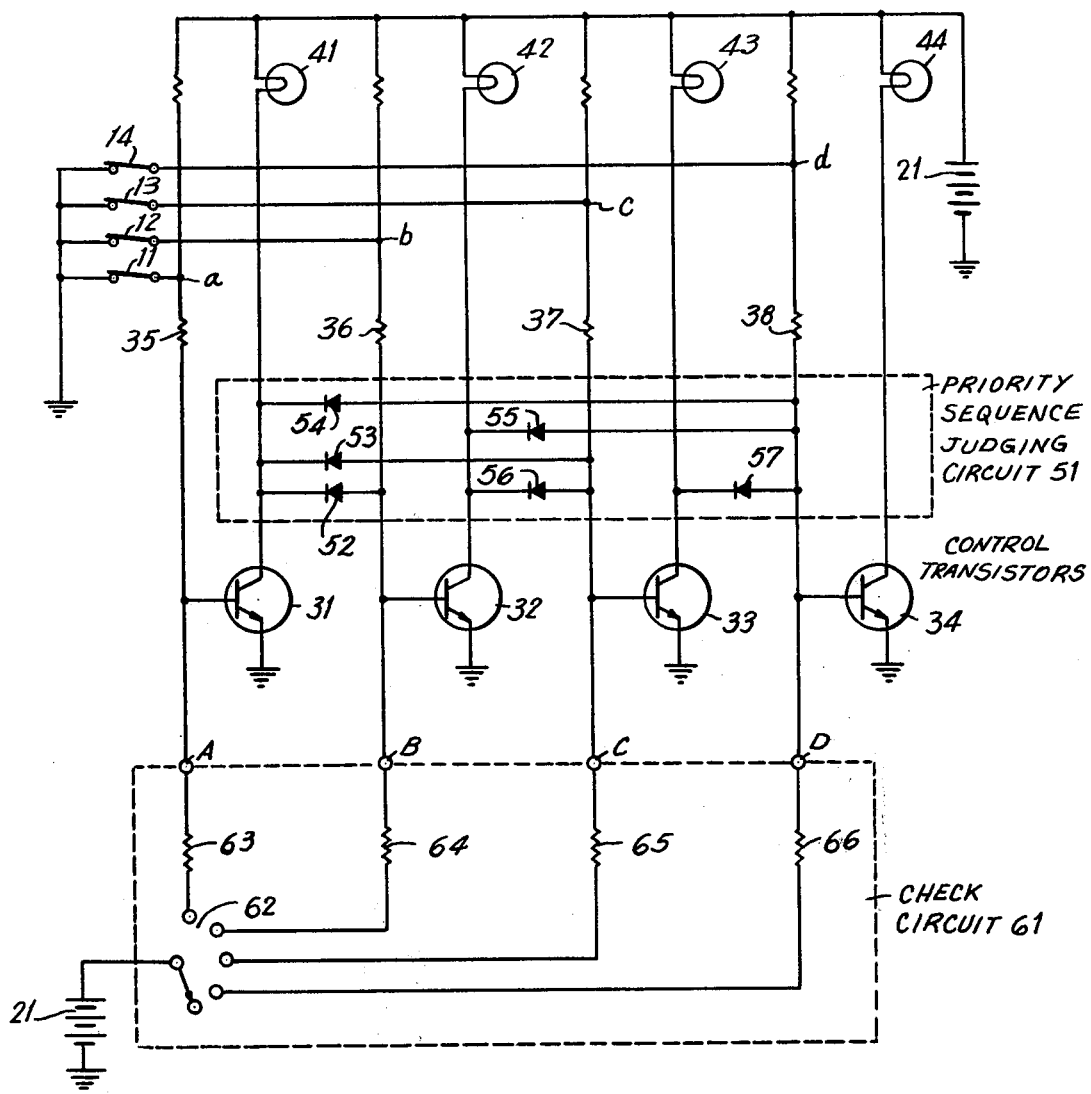
FIG. 1 is a circuit diagram of an embodiment of a warning system of the prior art.

FIG. 1 shows a known embodiment of the warning system of the invention. The warning system of FIG. 1 comprises a plurality of sensors 11, 12, 13 and 14 positioned in different areas of an automotive vehicle. The sensors detect abnormal conditions in a shortage of engine oil, a broken filament of brake lamp, high radiator water temperature and low tire pressure.

A sensor has the configuration of a switch which opens mechanically when an abnormal event or condition is detected. More particularly, the switch has a fixed contact connected to a point at ground potential and a moving contact connected to the power supply or battery 21 and to the base electrodes of a plurality of control transistors 31 to 34 via resistors 35, 36, 37 and 38, respectively. The emitter electrodes of the transistors 31 to 34 are connected to points at ground potential and the collector electrodes of said transistors are connected to the power supply 21 via display lamps 41 to 44, respectively.

Figure 2:
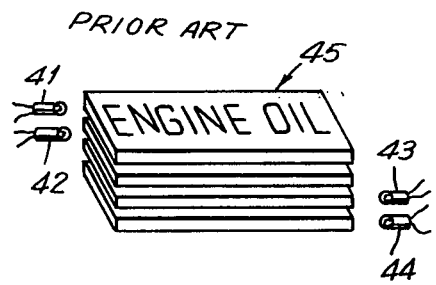
FIG. 2 is a schematic diagram of the display device of the warning system of FIG. 1.

The display lamps 41 to 44 are individually arranged at each side of multilayered display plates 45 on which the names of the operating elements are indicated, as shown in FIG. 2. Therefore, when one of the display lamps is selectively energized and lights up, the light enters the corresponding display plate.

When the engine oil volume sensor 11 detects an abnormality and the relevant switch contacts open, a voltage is applied to the base electrode of the control transistor 31. The transistor 31 thus becomes conductive and a current flows through a closed loop consisting of the power supply 21, the lamp 41, the collector, and emitter electrodes of the transistor 31 to ground. This causes the display lamp 41 to light up. As a result, the driver of the vehicle is advised that there is a shortage of engine oil via the "ENGINE OIL" indication or display on the display plate 45 (FIG. 2).

The aforedescribed warning system includes the priority sequence judging circuit 51. The priority sequence judging circuit 51 functions, when several sensors generate abnormal signals simultaneously, to determine the importance of these signals in accordance with an order of priority previously determined in accordance with the importance of the operating elements. The warning of alarm display is preferentially actuated in accordance with the signal of greatest importance. The priority sequence judging circuit 51 comprises a plurality of diodes 52 to 57 connected between the base electrodes and collector electrodes of the control transistors, as shown in FIG. 1.

In the circuit of FIG. 1, the priority order may be set in accordance with the output sequence of the sensors 11, 12, 13 and 14. Therefore, if the sensors 11 and 12 detect abnormal events or conditions simultaneously, the output terminals of both sensors are set at a high level simultaneously. However, the base electrode voltage of the transistor 32 is maintained at a low level by the clamp function of the diode 52. The transistor 32 is thus maintained in its non-conductive condition. As a result, the voltage is applied only to the transistor 31 and said transistor is switched to its conductive condition, causing only the corresponding lamp 41 to become energized and light up. When the abnormal condition is corrected by the addition of engine oil, the broken filament condition of the brake lamp, detected by the sensor 12, is displayed or indicated in the aforedescribed manner.

The warning system includes the check circuit 61, which checks whether or not each of the aforedescribed transistors and display lamps operates normally. The check circuit 61 of FIG. 1 includes a rotary switch 62 and a plurality of bias resistors 63 to 66. The fixed contacts of the rotary switch 62 are connected to the base electrodes of the control transistors 31 to 34, respectively, via resistors 63 to 66. The rotary switch arm or contact of the rotary switch 62 is connected to the power supply 21.

The checking operation is carried out as hereinafter explained. When a voltage is applied to the base electrode of each control transistor 31 to 34 via the fixed contacts of the rotary switch 62, said transistors are sequentially switched to their conductive conditions, as in the case of the detection of an abnormal condition by a sensor, causing the display lamps to become energized and light up sequentially. The normal or abnormal condition may thereby be checked.

As hereinbefore described, the warning system of FIG. 1 may be provided in diversified embodiments. However, the checking operation is troublesome because of the use of the rotary switch 62 in the check circuit 61, resulting in some undesirable aspects. The check circuit of the invention automatically provides checking in order to improve the checking operation.

Figure 3:
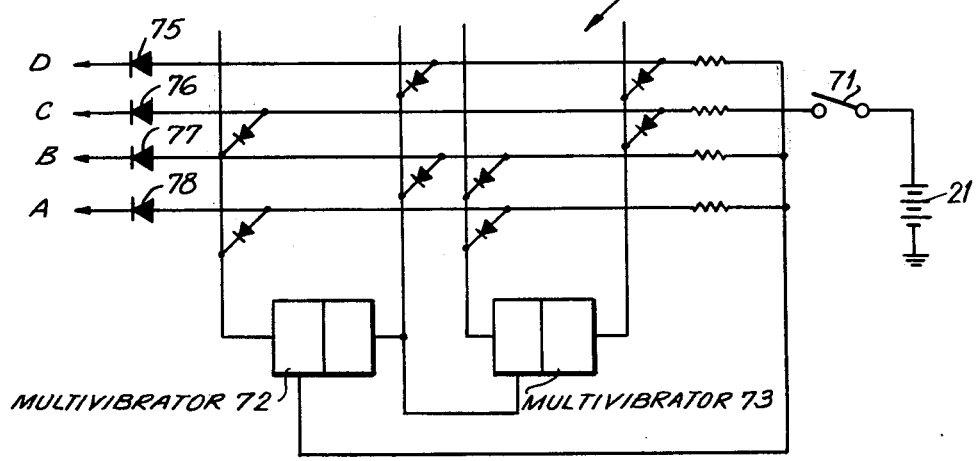
FIG. 3 is a circuit diagram of another embodiment of the prior art of the check circuit of the warning system of FIG. 1.

The check circuit of FIG. 3 comprises a check switch 71, a pair of cascade-connected multivibrators 72 and 73, and a diode matrix circuit 74 connected to the outputs of the multivibrators. The BCD code, such as, for example, 1010, from the multivibrators 72 and 73, is decoded by the diode matrix circuit 74 and a high level potential is applied only to the desired control transistor, such as, for example, the transistor 31, of FIG. 1. As a result, only the necessary display lamp, such as, for example, the lamp 41, lights up. Then, only the display lamp 42 lights up via the next BCD code 0110. Different BCD codes are used sequentially, and thereby all the display lamps light up, sequentially. This enables a check of whether or not the transistors and lamps operate normally.

Reverse current preventing diodes 75, 76, 77 and 78 are included in the check circuit of FIG. 3. The check circuit of FIG. 3 provides excellent operability, but has the same disadvantages as when signal processing is performed digitally, due to the use of multivibrators. This results in malfunction due to the generation of pulse noise, which is peculiar to automotive vehicles. Furthermore, the great number of circuits raises the cost.

Figure 4:
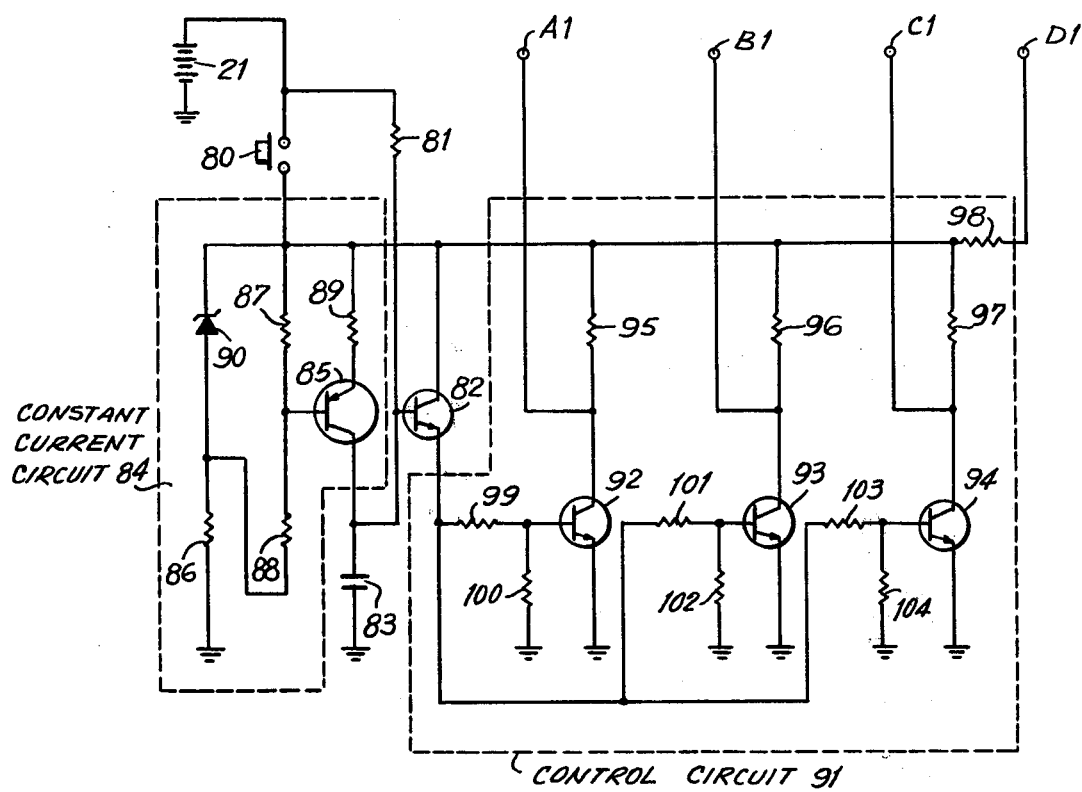
FIG. 4 is a circuit diagram of an embodiment of the check circuit of the invention.

FIG. 4 shows the check circuit of the invention. In the circuit of FIG. 4, the power supply or battery 21 is connected to one contact of a check switch 80 and a resistor 81 having a high resistance value. The other terminal of the resistor 81 is connected to the base electrode of an emitter follower transistor 82 and one electrode of a condenser 83. The same electrode of the condenser 83 is connected to the collector electrode of a transistor 85 of a constant current circuit 84. The other electrode of the condenser 83 is connected to a point at ground potential.

The constant current circuit 84, as is well known, comprises the transistor 85, resistors 86, 87, 88 and 89, and a Zener diode 90. A common point in the connection of the resistors 87 and 89 and the Zener diode 90 is connected to the other contact of the check switch 80. Thus, when the check switch 80 closes, a constant current is supplied to the condenser 83. The condenser 83 is charged by the constant current, and the voltage increases linearly. However, a voltage is applied to the condenser 83 via the high resistance resistor 81, even when the check switch 80 is open. The condenser 83 is charged at a potential of about 0.7 volts, which is the forward voltage between the base electrode and emitter electrode of the transmitter 82. This voltage makes the charging start time of the condenser 83 stably by the check switch 80, and prevents any malfunction of the control circuit 91 of the next stage.

The control circuit 91 of FIG. 4 comprises three transistors 92, 93 and 94, which are all grounded at their emitter electrodes. The collector electrodes of the transistors 92, 93 and 94 are connected to connecting terminals A1, B1, C1 and D1, which are connected to terminals A, B, C and D, respectively, of the check circuit 61 of the warning system of FIG. 1. The connecting terminals A1, B1, C1 and D1 are connected to the other contact of the check switch 80 via resistors 95, 96, 97 and 98. When the check switch 80 is closed, the battery voltage is applied via the resistors 95 to 98. This means that the same condition as the detection of an abnormal condition is provided for each control transistor 31 to 34 of the warning system. However, in this condition, only the control transistor 31 is switched to its conductive condition by the operation of the priority sequence judging circuit 51, as hereinbefore described.

Under the aforedescribed condition, it is impossible to check for all items. Therefore, in order to remove such disadvantage, voltage dividers, consisting of resistors 99 and 100, 101 and 102, and 103 and 104, and having different voltage dividing ratios, are connected to the base electrodes of the transistors 92, 93 and 94, respectively. Furthermore, one terminal of each of the resistors 99, 101 and 103 is connected to the emitter electrode of the emitter follower transistor 82.

The voltage dividing ratios of the voltage dividers are set in the following relation: Resistors 99 and 100 < resistors 101 and 102 < resistors 103 and 104.

The transistor 92 is therefore switched to its conductive condition, at first, by the voltage of the emitter follower transistor 82, increased by the charging voltage of the condenser 83 after the check switch 80 is closed. The transistor 93 is then switched to its conductive condition, and the transistor 94 is thereafter switched to its conductive condition after predetermined time delays. The voltages applied to the connecting terminals A1 to D1 are thus sequentially clamped at predetermined time delays to the voltage between the collector electrode and the emitter electrode of the transistors 92, 93 an 94, and are decreased. As a result, the control transistors 31, 32, 33 and 34 of the warning system of FIG. 1 are switched to their conductive condition in the same sequence, with the help of the determining operations of the priority sequence judging circuit 51.

The operation of the check circuit of the invention is explained with reference to the time charts shown in FIGS. 5a to 5i. When the check switch 80 is closed, the battery voltage (FIG. 5a) is applied to the input terminal of the constant current circuit 84. The constant current circuit 84 is thus in operating condition. Therefore, the condenser 83 is charged with a constant current from the constant current circuit 84.

Since the potential of the emitter electrode of the emitter follower transistor 82 is almost zero volts, any of the transistors 92, 93 and 94 is in its non-conductive condition. For this reason, the battery voltage is applied to each connecting terminal A1 to D1 via the resistors 95 to 98. This condition is the same as that obtained when all the sensors simultaneously detect abnormal conditions. Due to the determination operation of the priority sequence judging circuit 51 (FIG. 1), however, only the control transistor 31, corresponding to the operating member in the highest priority order, is switched to its conductive condition. Thus, the display lamp 41 is energized and lights up. If the display lamp 41 does not light up at such time, it means that there is an abnormal condition or failure in the warning system, particularly in a transistor or display lamp of said warning system.

The potential of the emitter electrode of the emitter follower transistor 82 increases at the time T1 after the check switch 80 is closed. The transistor 92 is then switched to its conductive condition. The applied voltage at the connecting terminal A1 thus decreases, as shown in FIG. 5b. The control transistor 31 is switched to its non-conductive condition and the display lamp 41 is deenergized and goes out (FIG. 5f). As a result, the control transistor 32 is switched to its conductive condition by the operation of the priority sequence judging circuit 51 and the display lamp 42 is energized and lights up.

The transistor 93 is then switched to its conductive condition with the increase of the charging voltage of the condenser 83, and the applied voltage at the connecting terminal B1 decreases (FIG. 5c). Thus, the display lamp 42 is deenergized and goes out (FIG. 5g). Thereafter, by the same operation as hereinbefore described, the display lamp 43 is energized and lights up at the time T2 and is deenergized and goes out at the time T3 (FIG. 5h). In addition, the display lamp 44 is energized and lights up at the time T3. At such time, when the check switch 80 is opened, the display lamp 44 is deenergized and goes out (FIG. 5i).

As hereinbefore described, the integrity of the plurality of control transistors and display lamps of the warning system can be checked, item by item, in accordance with the degree of importance of the item. In the aforedescribed embodiment, the check for the integrity of the control transistors and display lamps is performed sequentially, in accordance with the greatest importance, in accordance with the priority, sequence judging circuit. However, in the present invention, it is possible to perform the check sequentially in accordance with the least importance. In addition, it is obvious that the number of the check items in the check circuit of the invention can be set four or more.

Although the check circuit of the invention is of simple structure, used with great convenience for a check operation and is very economical in manufacture and use, such circuit automatically checks the integrity of the warning system efficiently, effectively and reliably. Furthermore, in the check circuit of the prior art, shown in FIG. 3, it is impossible to check all the items, since only the control system corresponding to the sensor 11 can operate due to the operation of the priority sequence judging circuit, under the supposition that said sensor detects an abnormal condition.

In the check circuit of the invention, however, the operating condition of the control circuit is converted forcibly to its non-operating condition at a predetermined time delay and the aforedescribed disadvantage is therefore prevented. This is a distinctive advantage of the circuit of the invention. Considering these advantages, the invention has an excellent effect in a vehicle warning system.

While the invention has been described by means of a specific example and in a specific embodiment, we do not wish to be limited thereto, for obvious modifications will occur to those skilled in the art without departing from the spirit and scope of the invention.

We claim:

1. A check circuit for checking a vehicle warning system, said vehicle warning system having a plurality of sensors each positioned at a corresponding one of a plurality of operating elements of a vehicle, the integrity of which elements is to be supervised, a plurality of warning devices each provided for a corresponding one of the sensors and controlled in operation by an abnormality detection signal from the corresponding one of the sensors, and a priority sequence judging circuit connected between the sensors and the warning devices for determining the degree of importance of detection signals from the sensors and preferentially providing an output to the warning devices in accordance with the priority of greatest importance, said check circuit comprising
simulating circuit means for artificially creating the same condition as that obtained when the sensors detect abnormalities to actuate all the warning devices; and
delay circuit means connected to the simulating circuit means and coupled to the warning devices for releasing said condition in accordance with a predetermined sequence at predetermined time delays whereby the integrity of the warning devices is checkable, item by item, in accordance with said sequence.

2. A check circuit as claimed in claim 1, wherein the vehicle warning system includes a source of electrical energy, and wherein the simulating circuit means comprises a check switch having one terminal connected to the source of electrical energy and another terminal coupled to each of the warning devices, a plurality of semiconductor switching devices each connected between a corresponding one of the warning devices and a point at reference potential, said semiconductor switching devices being in normally non-conductive condition, and a charging circuit connected to the other terminal of the check switch and coupled to the semiconductor switching devices, and the delay circuit means comprises bias circuit means coupled between the charging circuit and each of the semiconductor switching devices, said bias circuit means producing bias voltages controlling the semiconductor switching devices in operation sequentially to switch said switching devices to their conductive condition in accordance with the output voltage level of the charging circuit.

3. A check circuit as claimed in claim 2, wherein each of the semiconductor switching devices comprises a transistor.

4. A check circuit as claimed in claim 2, wherein the charging circuit comprises a condenser coupled to the semiconductor switching devices and a constant current circuit connected between the other terminal of the check switch and the condenser.

5. A check circuit as claimed in claim 2, wherein the bias circuit means comprise a plurality of voltage divider circuits each comprising a pair of resistors connected to the charging circuit and connected to each other at a common point, each of the voltage divider circuits providing a voltage ratio different from those of the other voltage divider circuits, the common point of each of the voltage divider circuits being connected to a corresponding one of the semiconductor switching devices.

6. A check circuit as claimed in claim 2, wherein the constant current circuit of the charging circuit includes a first resistor of predetermined resistance value, and wherein the simulating circuit means further comprises a second resistor having a higher resistance value than the first resistor and connected between the source of electrical energy and the condenser, said second resistor constantly precharging said condenser in normal conditions.

* * * * *